United States Patent [19]

Hashizume

[11] Patent Number: 4,931,876
[45] Date of Patent: Jun. 5, 1990

[54] ELECTROPHOTOGRAPHIC RECORDING APPARATUS FOR A FACSIMILE DEVICE

[75] Inventor: Hiroshi Hashizume, Tokyo, Japan

[73] Assignee: Kabushiki Kaisha Toshiba, Kanagawa, Japan

[21] Appl. No.: 250,464

[22] Filed: Sep. 28, 1988

[30] Foreign Application Priority Data

Sep. 29, 1987 [JP] Japan .................. 62-147605[U]

[51] Int. Cl.⁵ .................. H04N 1/29; G01D 15/14
[52] U.S. Cl. .................. 358/300; 346/154; 346/155; 346/160
[58] Field of Search .................. 358/300, 302, 296; 346/154, 160, 155

[56] References Cited

U.S. PATENT DOCUMENTS 4,525,729  6/1985  Agulnek .................. 346/160
4,694,310  9/1987  Saito .................. 346/160
4,757,332  7/1988  Yuasa .................. 346/160
4,851,926  7/1989  Ishikawa .................. 358/300

FOREIGN PATENT DOCUMENTS

59-592  12/1985  Japan .

Primary Examiner—Bruce A. Reynolds
Assistant Examiner—Scott A. Rogers
Attorney, Agent, or Firm—Finnegan, Henderson, Farabow, Garrett and Dunner

[57] ABSTRACT

An electrophotographic recording apparatus for a facsimile device in which exposure and development are performed simultaneously at the same position, and exposure, development, paper feed, rotation of the photosensitive body and fixation of the toner to the paper are performed synchronously with the receipt of image data for each line.

20 Claims, 12 Drawing Sheets

ELECTROPHOTOGRAPHIC RECORDING APPARATUS FOR A FACSIMILE DEVICE

BACKGROUND OF THE INVENTION

The present invention relates to an electrophotographic recording apparatus for a facsimile device which is capable of recording received image data with high quality and without uneven density.

Carlson's process is typicall of electrophotographic recording systems using toner. This process includes charging, exposure, development, transfer, cleaning, and erasing steps performed sequentially with the respective components of the system being disposed around a photosensitive body.

Figure 12:
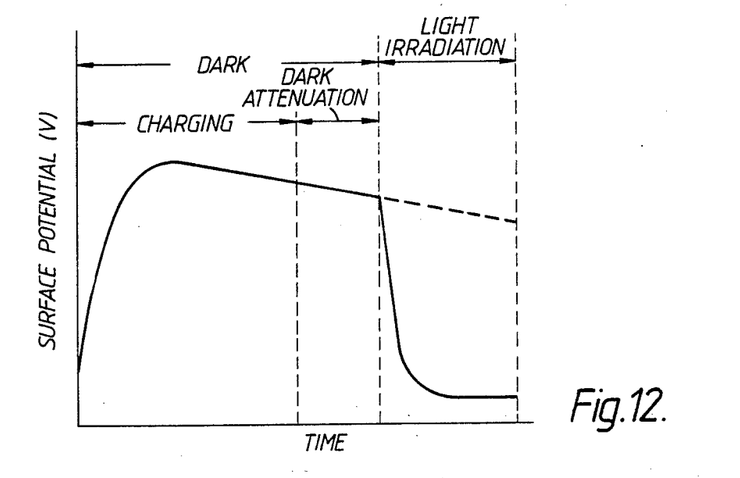
FIG. 12 is a timing chart showing the phenomenas of dark attenuation.

FIG. 12 shows time changes in the surface potential of the photosensitive body from charging to exposure in Carlson's process. As shown in FIG. 12, the surface potential V caused by a charger attenuates with time, which is hereinafter referred to as dark attenuation. Only that portion of a photosemiconductor layer of the photosensitive body exposed by light irradiation means becomes conductive and electrons become freely movable therein and thus the potential at the surface of that portion irradiated with light rapidly decreases. At the exposure step, an electrostatic latent image is formed on the photosensitive body surface as the difference between the quantity of electric charges in the areas where light strikes and the quantity of electric charges in the areas where light does not strike. The dark attenuation rate is, for example, about 20% in 5 seconds. The potential of electrostatic charges formed on the photosensitive body depends greatly on the time required for the charging and the time taken from the end of the charging to the start of the exposure. Therefore, in order to provide a high quality image without uneven density while maintaining the surface potential constant, it is necessary to maintain constant the time taken from the charging to the development.

The following problems arise in the use, in a facsimile device, of an electrophotographic recording apparatus according to Carlson's process and having the above qualities. Most facsimile devices employ a redundency reduction encoding system which compresses and transmits image data in each line in accordance with the degree of succession of white pixels and dark pixels in order to shorten the transmission time. The length of data contained in each line differs from that in a different line.

Therefore, the time required for decoding at the receiver end varies from line to line. Thus, when such image data is converted to an optical signal at the exposure unit without storing such data in memory, the time taken from the charging to the end of the exposure varies line to line and as a result the attenuation of the surface potential at the photosensitive body due to dark attenuation varies from line to line. The quantity of tone deposited at the subsequent exposing step varies from line to line to thereby produce variegated density distribution.

Therefore, if an electrophotographic recording apparatus using Carlson's process is applied in a facsimile device, a memory having a capacity large enough to store at least one page of image data must be provided.

The image data stored in the memory is then delivered to the exposure means at constant timing, and the time intervals taken for charging, development and transfer of data in all the lines must be equal. The provision of the memory increases the whole system cost.

In contrast with the recording apparatus using Carlson's process, Published Examined Japanese Patent Application No. 59592/1985 discloses a recording apparatus in which a photosensitive body includes a three-layered structure which comprises a transparent support layer, a transparent conductive layer and a photosemiconductor layer. An exposure device and a developing unit are disposed inside and outside, respectively, of the photosensitive body in opposing relationship such that simultaneously with light irradiation from the inside of the photosensitive body, toner is fed from the outside of the photosensitive body, which removes the use of a charger. According to this technique, charges are produced at that portion of the photosensitive body irradiated with light, and toner having a polarity opposite to that of the charges is deposited on that portion to form a toner image.

According to this technique, an electrostatic image is formed and developed at a single position around the photosensitive body, so that the image is not influenced by dark attenuation. This under consideration the electrophotographic recording system used in a facsimile device.

Prior U.S. application Ser. No. 174960, now U.S. Pat. No. 4,851,926 owned by the present asignee discloses an invention in which an electrophotographic recording apparatus for a facsimile device which uses the technique of the above Published Application No. 59593/1985, adding to the processing time intervals for the respective lines to thereby form a high quality image without uneven density without using an image data memory such as a page memory.

Finally, Carlson's process use a heat roller for fixing toner to the paper by melting the toner on the paper. In Calson's process, the toner is fixed to the paper by used a heated roller, because exposure developing and transfering are performed at an even speed.

However, in the above identified prior application(Ser. no. 174,960), exposure, developing, and transfering are performed at an uneven speed, because of the use of the process in a facsimile device.

Therefore, fixing the toner to the paper use of, a heated roller is not successful because melting of the toner on the paper is uneven.

SUMMARY OF THE INVENTION

It is an object of this invention to provide an electrophotographic recording apparatus for a facsimile device which uses the technique of the prior application, Ser. No. 174,960, and adds means for fixing the toner on the recording medium to the recording medium to thereby form a high quality image without uneven density.

This invention provides an electrophotographic recording apparatus for a facsimile device comprising:
  a photosensitive means including a transparent conductive layer and a photosemiconductor layer layered formed on a transparent support;
  exposure means having a plurality of light emitting elements disposed in a row and positioned on the transparent support side of the photosensitive means for converting input image data for one line to an optical signal, irradiating the transparent support of the photosensitive means with the converted light signal to form on the photossemiconductor an electrostatic latent image corresponding to the image data;

development means disposed on the opposite side of the photosensitive means from the exposure means for depositing toner having a polarity opposite to that of the electrostatic latent image on the latent image in the photosemiconductor layer by application of a predetermined bias voltage to a developing electrode;

transfer means for transferring the toner deposited on the photosemiconductor layer to a recording medium;

means for conveying the recording medium between the transfer means and the photosemiconductor layer;

means for rotating the photosensitive means;

fixing means for fixing the toner on the recording medium to the recording medium comprising two rollers disposed facing each other with the recording medium between for pressing the recording medium;

control means for operating the exposure means, the development means, the conveying means, the fixing means and the rotating means synchronously with the receipt of said received image data.

According to such inventive structure, exposure and development are performed simultaneously at the same position, and exposure, development, paper feed, rotation of the photosensitive body and fixation of the toner on the paper are performed synchronously with the receipt of image data in each line.

Therefore, according to this invention, uneven density due to uneven fixation heating is not produced, and thereby provides a uniform quality facsimile image.

DESCRIPTION OF THE PREFERRED EMBODIMENT

This invention will now be described in detail with reference to an embodiment thereof shown in the accompanying drawings.

Figure 1:
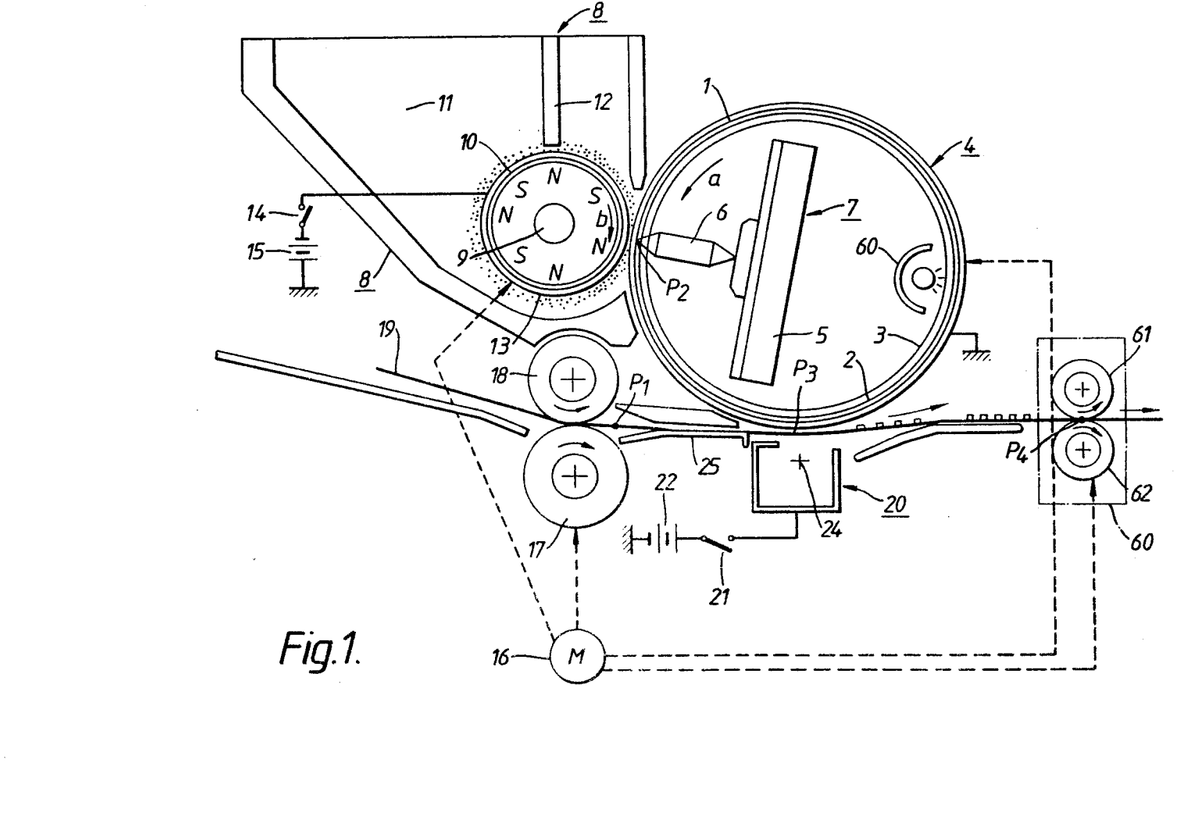
FIG. 1 shows the photosensitive body and other elements associated therewith.

FIG. 1 shows a photosensitive body and other elements associated therewith in the embodiment of this invention. Also shown in FIG. 10, the photosensitive body 4 has a three-layered structure which comprises a transparent conductive layer 2 and a photosemiconductor layer 1 superimposed in this order on a transparent support body 3. The transparent conductive layer 2 is grounded.

Referring to FIG. 1, disposed within the photosensitive body 4 are an optical write head 5 which comprises an array of light emitting diodes for one line which converts received electrical image data signal to an optical signal, and an array of self-collecting type lenses 6 which guides the light from the head 5 to the transparent support 3 to form on the photosemiconductor layer 1 an erect image having an equal magnification as viewed from the inside. These elements constitute an exposure means 7.

Disposed outside the photosensitive body 4 is a magnetic brush developing unit 8 such that the developing position is opposite to a position where light irradiation by the exposure means 7 is performed. The magnetic brush developing unit 8 includes a fixed permanent magnet shaft 9 and a concentric sleeve 10 provided rotatable on the shaft 9. Magnetic toner 13 is drawn and deposited magnetically on the outer surface of the sleeve 10. Furthermore a power source 15 which supplies a voltage across the sleeve 10 and the transparent conductive layer 2 of the photosensitive body 4 such that the sleeve is negative in potential relative to the conductive layer, a switch 14, a hopper 11, and a toner regulating plate 12 are provided. The magnetic toner 13 is a mixture of fine resin powder and iron powder called a carrier.

A transfer unit 20 is provided under the photosensitive body 4. A voltage is applied across a metal wire 24 and the transparent conductive layer 2 via a switch for a power source 22 such that the metal wire 24 is positive in potential relative to the layer 2.

Recording paper 19 is carried by a drive roller 17 and a feed roller 18 via a guide plate 25 between the transfer unit 20 and the photosensitive body 4.

The paper is then dicharged via a fixing device 60 comprising press roller 61 and press roller 62. The drive roller 17 is rotated by a pulse motor 16 which also drives the photosensitive body 4, sleeve 10, press roller 61 and press roller 62. Appropriate gear wheels are provided between these elements and the pulse motor 16 to thereby coordinate the rotational speeds of the elements.

The paper with toner passes between press rollers 61 and 62 where the toner is fixed to the paper by pressure.

Also provided within the photosensitive body 4 is a light source 60 which initializes the charging state of the photosemiconductor layer 1 by light irradiation therefrom.

The principles of the exposure, development and transfer process performed by this apparatus will now be described in accordance with the process steps shown in FIGS. 11(a)–(d). When a part of the photosemiconductor layer 1 of the photosensitive body 4 is irradiated with light, that irradiated portion alone becomes conductive while other nonirradiated portions remain nonconductive. Therefore, if the switch 14 of the developing unit 8 is turned on synchronously with light irradiation for one line by the light irradiation means 7, the potential of the sleeve 10 becomes negative relative to that of the transparent conductive layer 2, so that positive charges appear in the irradiated portion of the photosemiconductor layer 1.

Figure 11A:
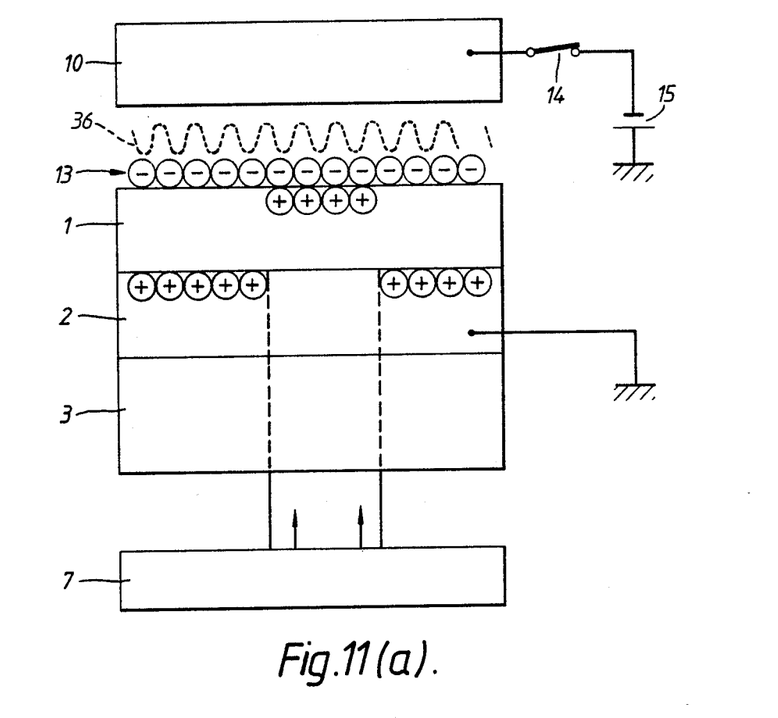
FIG. 11 is an operation chart explaining the principle of electrophotographic recording used in one embodiment of the invention.

As described above, the toner mixture 36 is composed of carrier and toner powder. As the sleeve 10 rotates, the carrier and toner powder cause friction, so that the toner 13 is charged negatively. Therefore, the negatively charged toner 13 is drawn against and deposited on the surface of the photosemiconductor layer 1 by turning on the switch 14, as shown in FIG. 11(a).

Figure 11B:
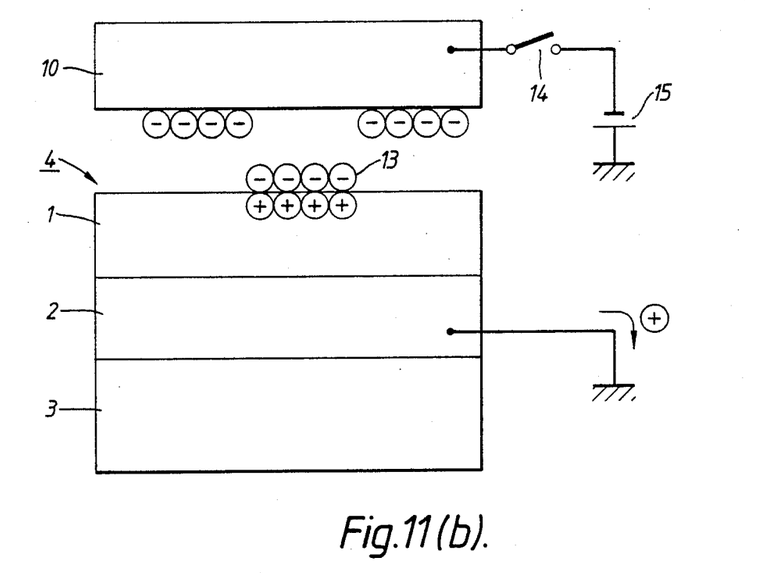

The switch 14 is kept on for a predetermined time and then turned off until the developing operation for the next line is performed. FIG. 11(b) shows the state of the toner during the off interval. When the switch 14 is turned off, the positive charges in the transparent conductive layer 2 flow to ground. Since the toner at that portion of the conductive layer not irradiated with light is no longer drawn electrostatically onto the surface of the photosensitive body 4, it is drawn to the sleeve 10 by the magnetic force of the permanent magnet shaft 9. Thus toner 13 is deposited only on the irradiated surface portion of the photosensitive body 4.

Figure 11C:
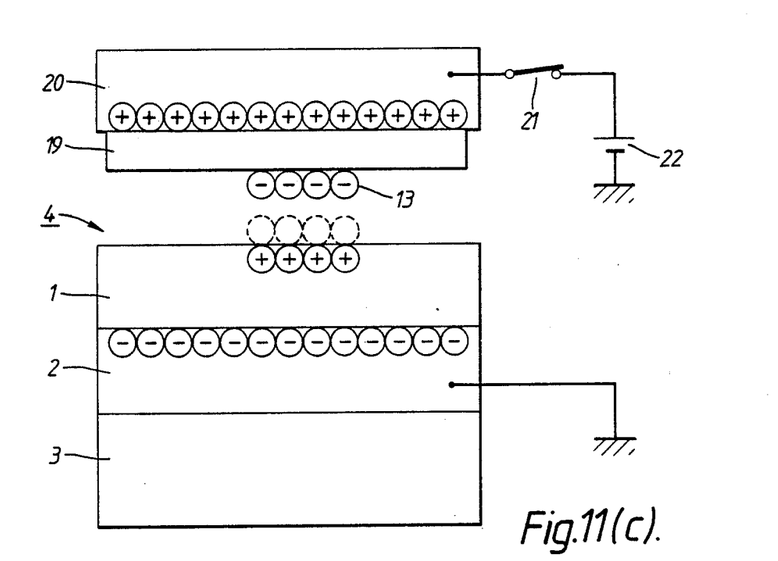
Figure 11D:
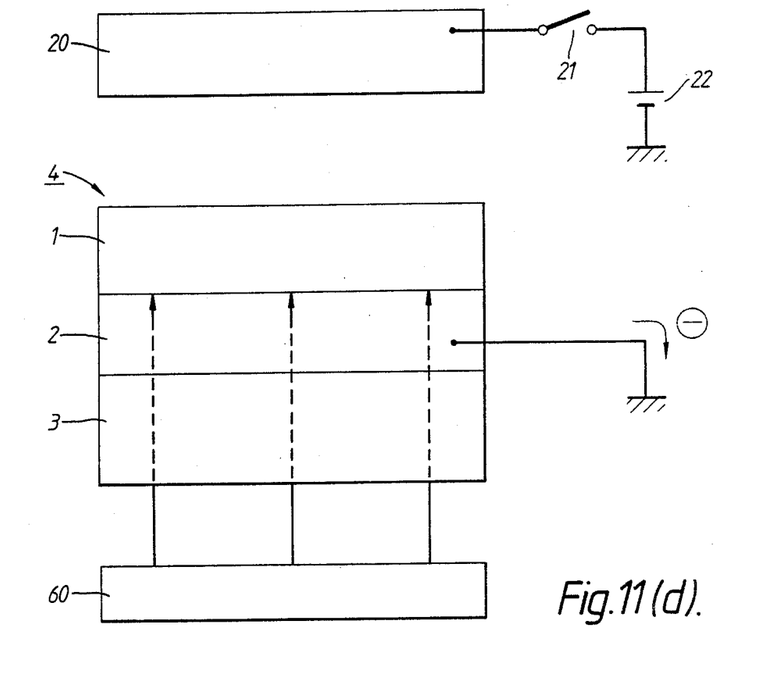

In the transfer process, as shown in FIG. 11(c), the switch 21 is turned on to apply a voltage across the transfer unit 20 and the transparent conductive layer 2 such that same is positive in potential relative to the transfer unit 20 to thereby render the back of the recording paper 19 positive in potential. Thus negatively charged toner 13 is drawn to the paper 19 surface by Coulomb force. Negative charges appear on the photosemiconductor layer side surface of the transparent conductive layer 2 and react with negative toner 13 to cause a repulsion force to thereby ensure more reliable deposition of the toner 13 onto the paper 19. When the transfer operation ends, the switch 21 is turned off as shown in FIG. 11(d) unti the transfer of the next line starts. In order to eliminate the remaining charges in the photosemiconductor layer 1, the inside of the photosensitive body 4 is irradiated with light by the light source 60, as shown in FIG. 11(d), to become conductive so that the charges on the photosemiconductor layer 1 escape to ground to thereby initialize the charge state of the photosemiconductor layer 1. By repetition of the above operation for each line, a toner image on the photosensitive body is formed on the paper 19.

Figure 2:
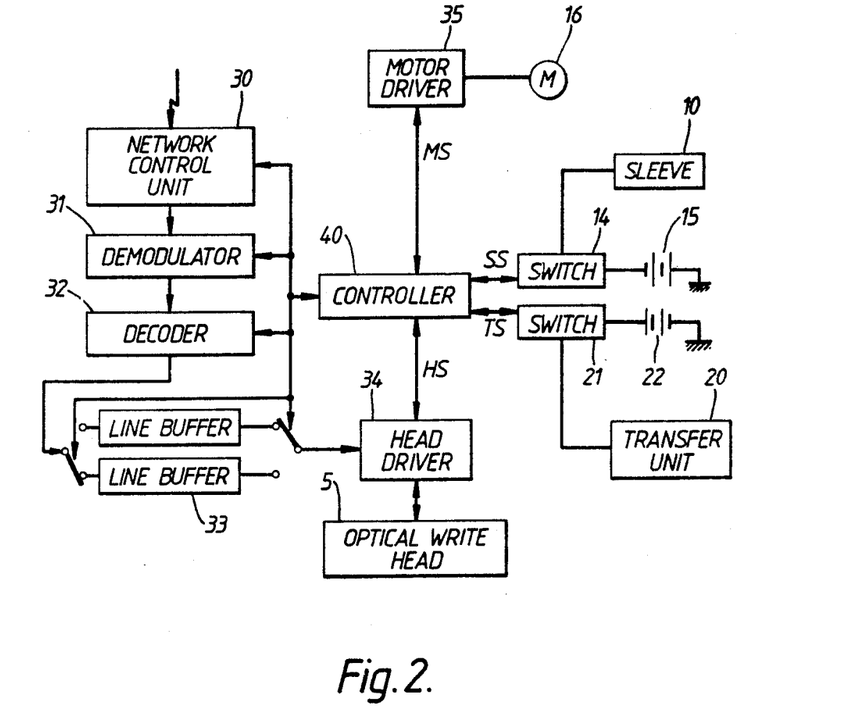
FIG. 2 is a block diagram showing an illustrative structure of a control system is one embodiment of this invention.

FIG. 2 shows an illustrative structure of a control system used when the electrophotographic recording apparatus of this invention is provided in a facsimile device.

Like a conventional facsimile receiver, the facsimile device includes a network control unit 30 which controls switching between the facsimile telephone lines, a demodulator 31 which demodulates the received signal, and a decoder 32 which decodes the received image data. The decoded image data is to input a line memory 33 which includes two line buffers which are used such that image data is input to one line buffer while second image data is read out from the other line buffer in an alternately switched manner.

The image data output by the line memory 33 is input to a head drive circuit 34 which includes a plurality of shift registers corresponding, for example, to the light emitting diodes of the optical write head 5. The light emitting diodes are turned on and off in accordance with the input image data to form an electrostatic latent image corresponding to the image data for each line on the photosemiconductor layer 1 of the photosensitive body 4. The start timing and time duration of the operation of the head drive circuit 34 for each line is controlled by a control signal HS from a controller 40.

The controller 40 also controls the operation start timing and time duration of the operation of a motor drive circuit 35 and switches 14 and 21 for each line using signals MS, SS and TS. The controller 40 further controls the network control unit 30, and demodulator 31 and the decoder 32 and switching between the line buffers 33.

The timing control of the circuits 34, 35, 14 and 21 using the controller 40 will now be described using the timing chart of FIG. 3. The controller 40 detects a signal EOL (End of Line) contained in the received image data, thereby detecting when the end of the data in each line appears. Synchronously with the EOL signal (FIG. 3(a)), the timing control of the respective circuit 34, 35, 14 and 21 is performed.

It takes a predetermined delay time from the inputting of the image data to the decoder unit 32 through the processing of the data by the demodulator 31 to the inputting of the resulting data via the line buffer 33 to the head drive circuit 34. When the controller 40 detects an EOL signal intervening between adjacent data items in each line, it delays the EOL signals in the line by the predetermined times to form EOL' signals (FIG. 3(a)). EOL' signals are EOL signals which are distributed at uneven intervals in each line and delayed by the predetermined times.

The controller 40 controls exposure by the light irradiation means 7, development by the developing unit 8, rotation of the photosensitive body 4, and the conveyance of recording paper synchronously with the formed EOL' signals.

Figure 3:
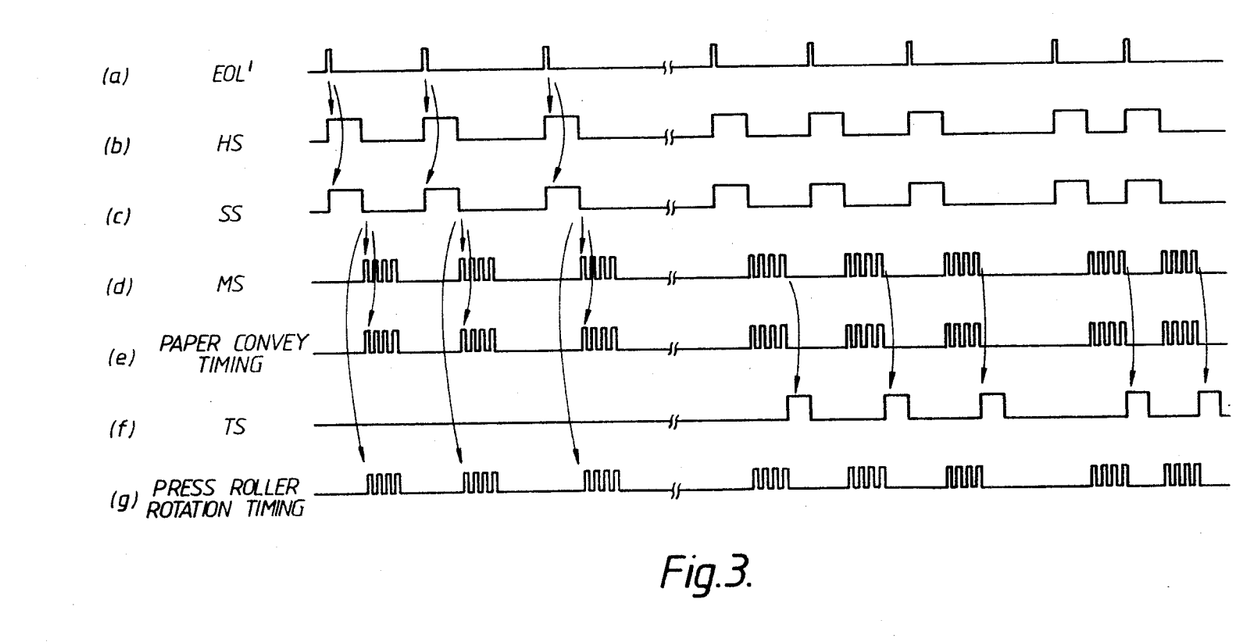
FIG. 3 is a timing chart showing the control operation of a controller.

When the first EOL' signal is produced, the image data in the first line has been input to the head driver 34 and the controller 40 changes the signals HS and SS to "1" when the first EOL' is produced (FIGS. 3(a), (b), (c). This causes the optical write head 5 to be driven in accordance with the first line image data to thereby form an electrostatic latent image corresponding to the first line image data on the photosensitive body 4, as shown in FIG. 11(a), and to deposit toner on that portion of photosensitive body 4 corresponding to the first line. The signals HS and SS fall to "0" when a set predetermined time has past.

The controller 40 inputs a predetermined number of pulse signals MS to the motor driver 35 synchronously with the fall of the signal SS to rotate the pulse motor 16 through a predetermined angle. The pulse motor 16 is connected via gear wheels to the rotational shaft of the photosensitive body 4, the rotational shaft of sleeve 10, press rollers 61, 62 and the drive roller 17, so that the photosensitive body 4 and the sleeve 10 are rotated via corresponding predetermined angles in the directions a and b (FIG. 1), in accordance with the rotation of the pulse motor 16, and stopped (FIG. 37(d)). Recording paper 19 is conveyed through a predetermined distance from a predetermined standby position P1 (FIG. 1) in accordance with the rotation of the drive roller 17 (FIG. 3(e)). When the signal SS falls to "0", the switch 14 is turned off and, as a result, toner is deposited only on that portion of the body irradiated with light, as shown in FIG. 11(b).

When a second EOL' signal is generated, the controller 40 changes the signals SS and HS to "1" simultaneously with the generation of the EOL' signal, as mentioned above, to turn on the switch 14 and drive the head driver 34. When the second EOL' signal is generated, the image data for the second line has already been inputted to the head driver 34 and thus toner is deposited on that portion of the photosensitive body 4 corresponding to the second line. The controller 40 maintains the signals SS and HS at "1" for second a predetermined time and then changes them to "0". Simultaneously with the signals SS falling, the controller 40 outputs a predetermined number of pulse signals MS. Thus toner is deposited only on that portion of the photosensitive body 4 corresponding to the second line and irradiated with light. The photosensitive body 4 and sleeve 10 are rotated by corresponding predermined angles by a second rotation of the pulse motor 16 in accordance with the second pulse signals MS to thereby convey the recording paper 19 through a second predetermined distance.

In this way, the controller 40 repeats transmission of signals HS, SS and MS synchronoysly with the scanning line signal EOL' for control purposes. According to this control operation, the width of one pulse of the signal HS, as taken as an example, is the same for all the respective lines and the standby time interval from the fall of a pulse to the rise of the next pulse differs for each different line. As a result, in the case of an exposure operation using the signal HS, the light irradiation time for one line is the same for all the lines while the time interval from the end of exposure for a line to the start of exposure for the next line differs from that for a different line in accordance with the signal EOL.

This applies to the rotation of the photosensitive body 4, the conveyance of recording paper 19, the rotation of the press roller 61 and the press roller 62. The rotational distance of the photosensitive body 4 for each line, the distance through which the recording paper and the rotational distance of the press rollers 61, 62 for each line are the same for all the lines, while the time interval during which the photosensitive body 4 is at rest, the time interval during which the recording paper is at rest and the time interval during which the press roller 61, 62 are at rest vary from line to line and as a result the rotational speed of the photosensitive body 4, the conveyance speed of the recording paper 19 and the rotational speed of the press roller 61, 62 vary from line to line.

Assume that such control process proceeds and the position on the photosensitive body 4 corresponding to the first line rotates from the developing position $P_2$ to the transfer position $P_3$. The distance $\overline{P_2P_3}$ from the developing position $P_2$ to the transfer position $P_3$ on the photosensitive body 4 is set equal to the distance $\overline{P_1P_3}$ from the initial standby position $P_1$ to the transfer position $P_3$ on the recording paper, so that when the first line position on the photosensitive body 4 rotates to transfer position $P_3$, the leading end of the recording paper has arrived at the transfer position $P_3$. The time required for the photosensitive body 4 to rotate through the distance $\overline{P_2P_3}$ varies in accordance with the length of the image data, and is determined by counting EOL signals.

Thus the controller 40 counts EOL signals and starts the following transfer operation if the count has reached a predetermined value corresponding to the distance $\overline{P_2P_3}$ or $\overline{P_1P_3}$.

In the transfer process, the controller 40 inputs to the switch 21 a signal TS which becomes "1" synchronously with a fall of the MS signal and turns on the switch 21 at the same time of the pulse motor 16 being stopped (FIG. 3(f)). Thus, as shown in FIG. 11(c), the recording paper 19 is positively charged, the negatively charged toner is moved away from the photosensitive body 4 and transferred to the recording paper 19.

Assume that such control proceeds and the position on the press roller corresponding to the first line rotates from the fixing position P4.

The rotational distance of the press roller 61, 62 for each line is set equal to the rotational distance of the photosensitive body 4 for each line, so that the portion of the paper 19 pressed and conveyed by the press roller 61, 62 is equal to the portion of the paper 19 developed by the photosensitive body 4.

When the process is performed according to this embodiment, exposure and development are performed simultaneously, and the start timing of the exposure, development, the rotational speed of the photosensitive body 4, the conveyance speed of paper sheet 19, and the fixing the toner deposited on the paper sheet 19 by pressure from press roller 61 and 62 are performed synchronously when image data for each line is received.

As a result the toner is fixed to the paper to form a high quality image without uneven density.

Figure 5:
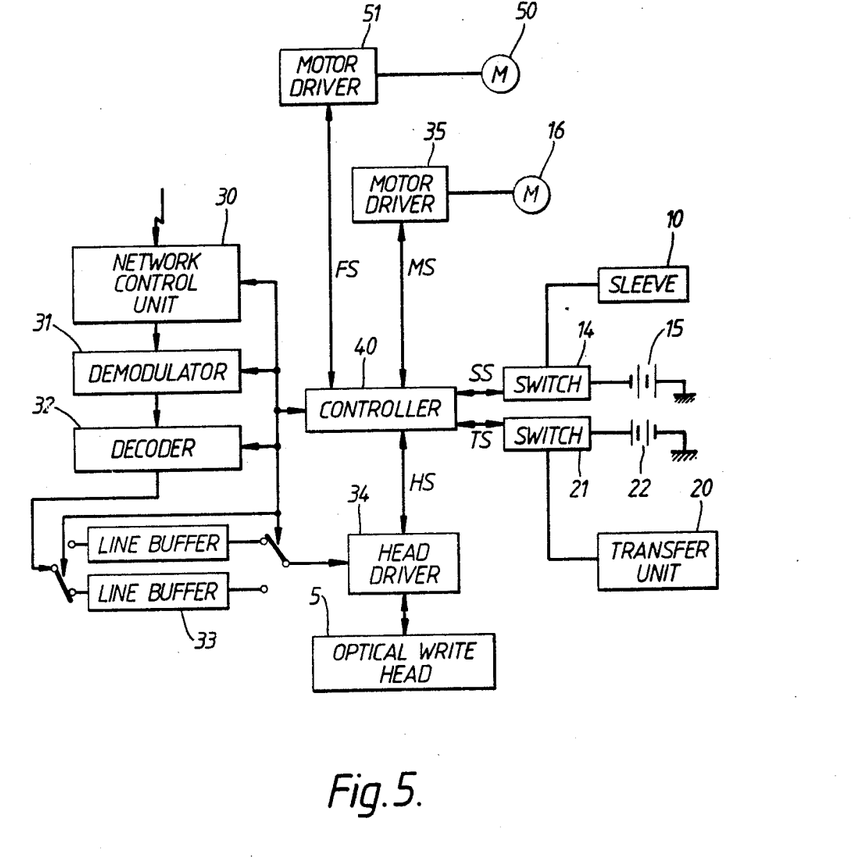
FIG. 5 is a block diagram showing an illustrative structure of a control system in one embodiment of this invention.
Figure 6:
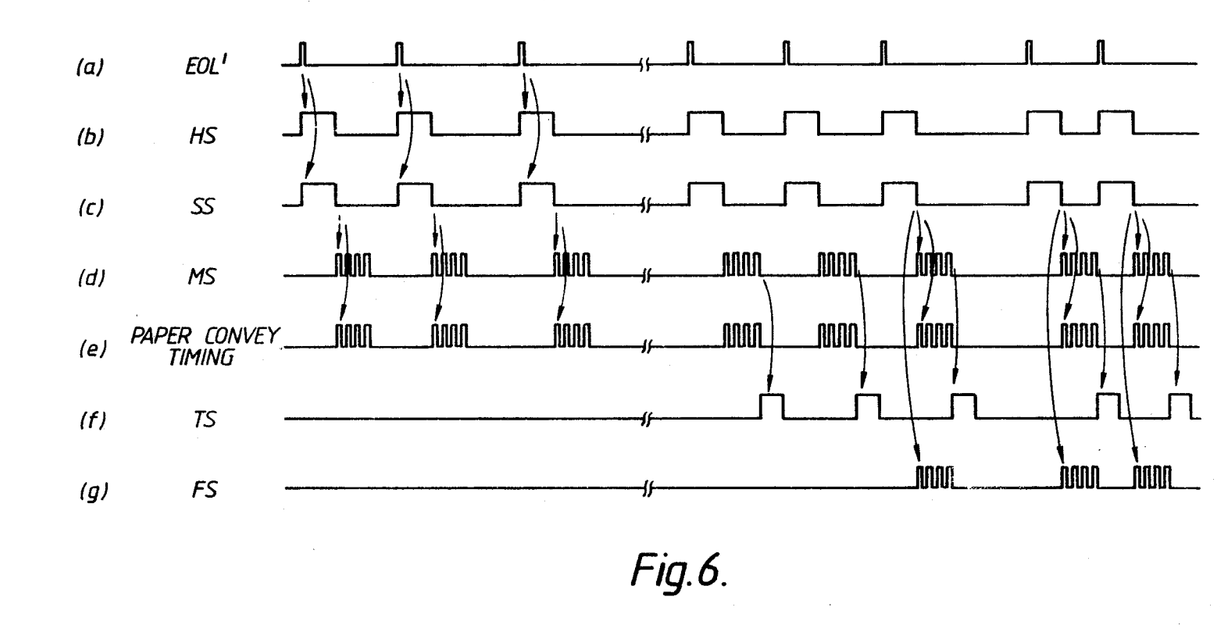
FIG. 6 is a timing chart showing the control operation of a controller.

A second embodiment of the present invention will now be described, with reference to FIGS. 4 through 6.

Figure 4:
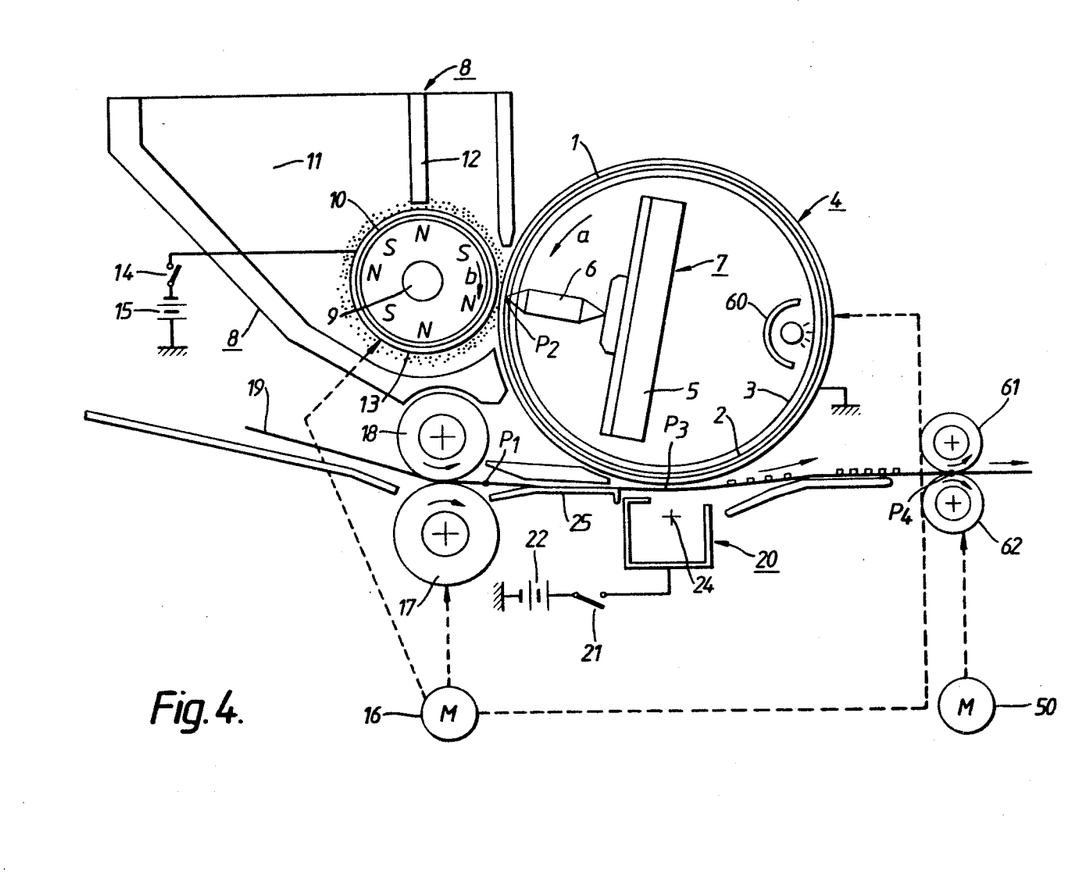
FIG. 4 shows the photosensitive body and other elements associated therewith.

As is shown in FIG. 4, press roller 61 and press roller 62 are rotated by pulse motor 50, the pulse motor 50 being different from pulse motor 16. The pulse motor 50 is driven by a motor driver 51 (FIG. 5). The motor driver 51 is controlled by controller 40 through signal FS. The photosensitive body 4, drive roller 17 and sleeve 10 are rotated by the pulse motor 16 and are controlled by controller 40 similarly to the first embodiment of the present invention (FIG. 1, FIG. 2, and FIG. 3).

The distance $\overline{P_3 P_4}$ from the transfer position P3 to the press position P4 is predetermined.

Thus the controller 40 counts EOL signals and the signal FS from a "0" to a "1", or vice versa, when the line count has reached a predetermined value corresponding to the distance $\overline{P_3 P_4}$. Press roller 61 and the press roller 62, then rotate and fix the toner to the paper 19.

Figure 8:
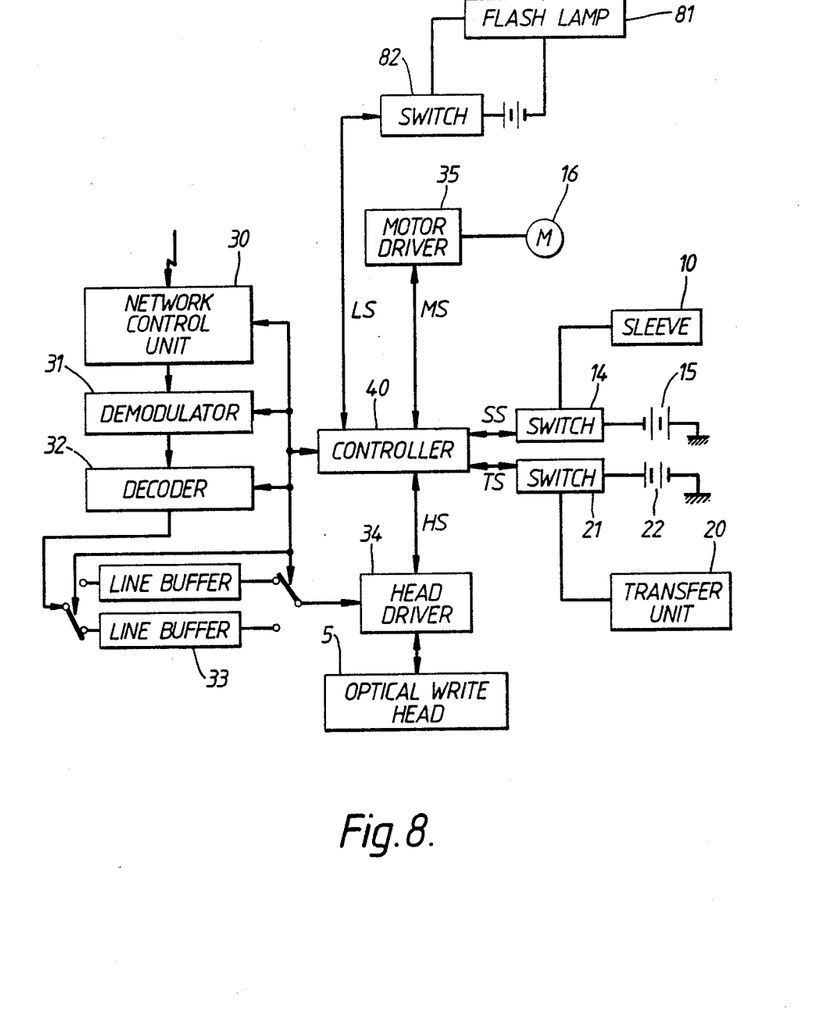
FIG. 8 is a block diagram showing an illustrative structure of a control system in one embodiment of this invention.
Figure 9:
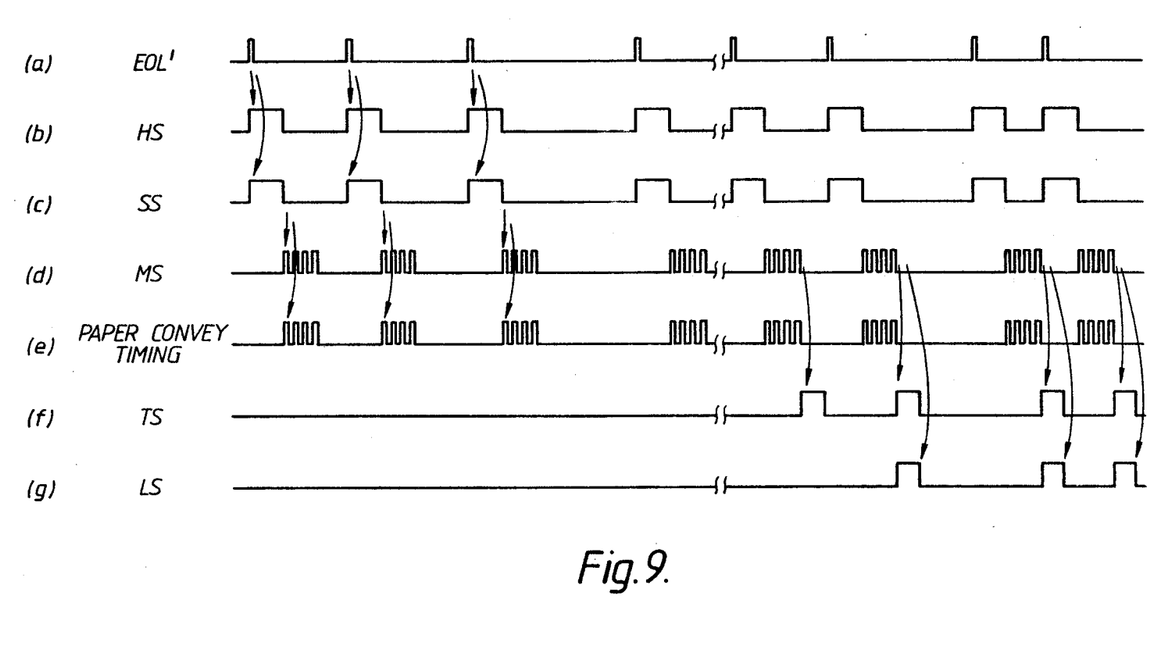
FIG. 9 is a timing chart showing the control operation of a controller.

A third embodiment of the present invention will now be described, with reference to FIGS. 7 through 9.

Figure 7:
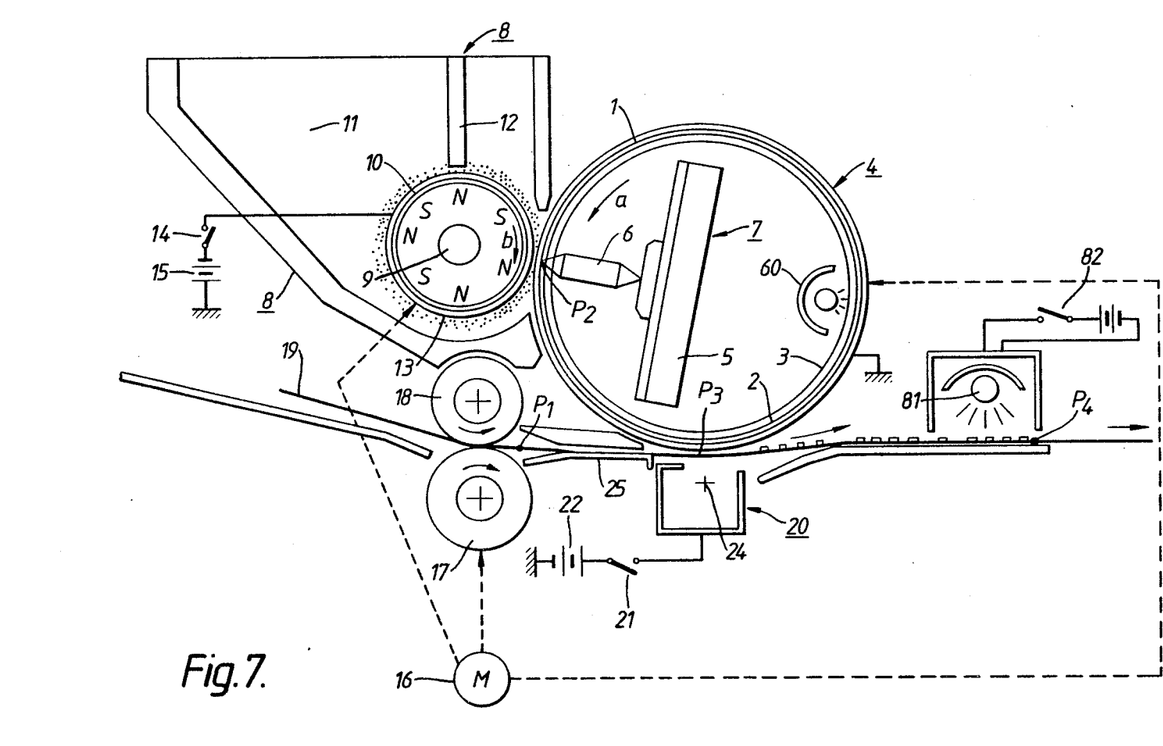
FIG. 7 shows the photosensitive body and other elements associated therewith.

As is shown in FIG. 7, a flash lamp 81 for fixing the toner onto the paper 19 is provided. The flash of the flash lamp 81 melts the toner onto the paper 19 and fixes the toner on the paper. The distance $\overline{P_3 P_4}$ from the transfer position P3 to the flash position P4 is predetermined. The controller 40 counts EOL signals and inputs to the switch 82 a signal LS which charges state when the count has reached a predetermined value corresponding to the distance $\overline{P_3 P_4}$.

In response to the charge in signal LS, flash lamp 81 flashes and fixes the toner to the paper 19.

According to this invention, the preferred embodiments may be modified in an appropriate manner. For example, all the voltages applied in the preferred embodiments may be inverted in polarity. While in the preferred embodiments the transparent conductive layer 2 and the photosemiconductor layer 1 are provided in this order on the transparent support 3 to form the photosensitive body 4, an insulating layer may be provided on the photosemiconductor layer 1 in which case the permittivity of the material between the photosensitive body 4 and the sleeve 10 and that of the material between the photosensitive body 4 and the transfer unit 20 are increased to thereby increase the quantity of charges forming a unit voltage, which means an effective use of the applied voltage.

While in the preferred embodiments the permanent magnet shaft 9 of the magnetic brush developing unit 8 is fixed and the sleeve 10 is rotated, the invention is not limited to this particular structure. The sleeve 10 may be fixed and the magnet shaft 9 may be rotated. Alternatively, the sleeve 10 and the magnet shaft may be rotated together.

While in the preferred embodiments the toner 36 is shown as being composed of a bi-ingredient, i.e., one comprising carrier and toner powders, the invention is not limited to it and one-ingredient toner may be used.

The transfer unit may be composed of a roller which pushes the recording paper 19 against the photosensitive body 4 instead of the transfer unit 20 of the preferred embodiments. In this case, the toner image is more easily transferred to the recording paper by the pressure force of the roller.

While in the preferred embodiments shown the magnetic brush developing unit 8 and the photosensitive body 4 are shown as being rotated in the opposite directions a and b, the invention is not limited to that embodiment. The photosensitive body 4 and the developing unit 8 may be rotated in the same directions, if desired.

Figure 10:
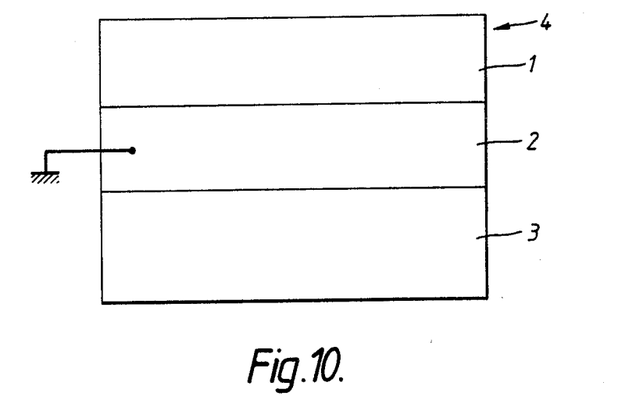
FIG. 10 is a cross section view of a photosensitive body used in one embodiment of the invention.

While in the preferred embodiments the photosensitive body 4 is shown as being drum-like, the invention is not so limited. For example, it is only required that the photosensitive body have a laminated structure, as shown in FIG. 10, i.e. For example, such body may have a flat-plate photosensitive structure.

What is claimed is:

1. An electrophotographic recording apparatus comprising:
    a photosensitive means including a transparent conductive layer and a photosemiconductor layer layered formed on a transparent support;
    exposure means having a plurality of light emitting elements disposed in a row and positioned on the transparent support side of the photosensitive means for converting input image data for one line to an optical signal, irradiating the transparent support of the photosensitive means with the converted light signal to form on the photosemiconductor an electrostatic latent image corresponding to the image data;
    development means disposed on the opposite side of the photosensitive means from the exposure means for depositing toner having a polarity opposite to that of the electrostatic latent image on the latent image in the photosemiconductor layer by application of a predetermined bias voltage to a developing electrode;
    transfer means for transferring the toner deposited on the photosemiconductor layer to a recording medium;
    means for conveying the recording medium between the transfer means and the photosemiconductor layer;
    means for rotating the photosensitive means;
    fixing means for fixing the toner on the recording medium to the recording medium comprising two rollers disposed facing each other with the recording medium therebetweens for pressing the recording medium;
    control means for operating the exposure means, the development means, the conveying means, the fixing means and the rotating means synchronously with the receipt of said received image data.

2. An electrophotographic recording apparatus according to claim 1, wherein the control means includes means for detecting an EOL signal representing the end of a line contained in the received data and forming a main scanning line synchronizing signal on the basis of the EOL signal for synchronizing purposes.

3. An electrophotographic recording apparatus according to claim 2, wherein the development means includes:
    a permanent magnet shaft, a sleeve disposed so as to surround the magnet shaft, a power source for applying a predetermined bias voltage to the sleeve, a switch for selectively connecting the power source to the sleeve and a magnetic brush developing unit for drawing toner magnetically onto the outer surface of the sleeve.

4. An electrophotographic recording apparatus according to claim 3, wherein the toner includes bi-ingredient toner of carrier and toner powers.

5. An electrophotographic recording apparatus according to claim 2, wherein the control means initiates light irradiation by the exposure means and application of the bias voltage to the development means substantially simultaneously with the rise of a main scanning line synchronizing signal and rotates the photosensitive means substantially simultaneously with removal of the bias voltage.

6. An electrophotographic recording apparatus comprising:
    a photosensitive means including a transparent conductive layer and a photosemiconductor layer layered formed on a transparent support;
    exposure means having a plurality of light emitting elements disposed in a row and positioned on the transparent support side of the photosensitive means for converting input image data for one line to an optical signal, irradiating the transparent support of the photosensitive means with the converted light signal to form on the photosemiconductor an electrostatic latent image corresponding to the image data;
    development means disposed on the opposite side of the photosensitive means from the exposure means for depositing toner having a polarity opposite to that of the electrostatic latent image on the latent image in the photosemiconductor layer by application of a predetermined bias voltage to a developing electrode;
    transfer means for transferring the toner deposited on the photosemiconductor layer to a recording medium;
    means for conveying the recording medium between the transfer means and the photosemiconductor layer;
    means for rotating the photosensitive means;
    fixing means for fixing the toner on the recording medium to the recording medium comprising a flash lamp;
    control means for operating the exposure means, the development means, the conveying means, the fixing means and the rotating means synchronously with the receipt of said received image data.

7. An electrophotographic recording apparatus according to claim 6, wherein the control means includes means for detecting an EOL signal representing the end of a line contained in the received data and forming a main scanning line synchronizing signal on the basis of the EOL signal for synchronizing purposes.

8. An electrophotographic recording apparatus according to claim 7, wherein the development means includes:

a permanent magnet shaft, a sleeve disposed so as to surround the magnet shaft, a power source for applying a predetermined bias voltage to the sleeve, a switch for selectively connecting the power source to the sleeve and a magnetic brush developing unit for drawing toner magnetically onto the outer surface of the sleeve.

9. An electrophotographic recording apparatus according to claim 8, wherein the toner includes bi-ingredient toner of carrier and toner powers.

10. An electrophotographic recording apparatus according to claim 7, wherein the control means initiates light irradiation by the exposure means and application of the bias voltage to the development means substantially simultaneously with the rise of a main scanning line synchronizing signal and rotates the photosensitive means substantially simultaneously with removal of the bias voltage.

11. An electrophotographic recording apparatus according to claim 1, wherein the recording medium conveying means, the rotating means and the fixing means are actuated by the same drive source.

12. An electrophotographic recording apparatus according to claim 1, wherein the recording medium conveying means, the rotating means and the fixing means are actuated by a plurality of drive sources.

13. An electrophotographic recording apparatus according to claim 1, wherein the exposure means includes:

an array of light emitting elements disposed in a row; and an array of self-collecting lenses for guiding the light from the array of light emitting elements to the transparent support of the photosensitive means.

14. The electrophotographic recording apparatus of claim 1 wherein said control means synchronizes the light irradiation timing of the exposure means for each line, the timing of the application of the bias voltage to the development means for each line, the start timing of the conveyance of the recording medium for each line, the start timing of the rotation of the photosensitive means for each line, and the start timing of the fixing of the toner to the recording medium with the receipt timing of the received image data for each line.

15. A method for operating an electrophotographic apparatus comprising:

providing a photosensitive means capable of holding an electrostatic image;

receiving electrical data representing an image;

converting said electrical data to an optical signal;

exposing said photosensitive means with said optical image;

depositing toner on said photosensitive layer;

transferring said deposited toner to a recording medium;

fixing the deposited toner to the recording medium by applying pressure to the deposited toner and recording medium with a pair of rollers disposed facing each other with the recording medium pressed therebetween;

wherein said converting, exposing, depositing, transferring, and fixing are performed synchronously with said receiving of electrical data.

16. The method of claim 15, wherein said converting, exposing, depositing, transferring and fixing are performed synchronously with the receipt of data representing each line of the image.

17. A method for operating an electrophotographic apparatus comprising:

providing a photosensitive means capable of holding an electrostatic image;

receiving electrical data representing an image;

converting said electrical data to an optical signal;

exposing said photosensitive means with said optical image;

depositing toner on said photosensitive layer;

transferring said deposited toner to a recording medium;

fixing the deposited toner to the recording medium by use of a flash lamp;

wherein said converting, exposing, depositing, transferring, and fixing are performed synchronously with said receiving of electrical data.

18. The method of claim 17, wherein said converting, exposing, depositing, transferring and fixing are performed synchronously with the receipt of data representing each line of the image.

19. An electrophotographic recording apparatus comprising;

a photosensitive means including a transparent conductive layer and a photosemiconductor layer formed on a transparent support;

exposure means having a plurality of light emitting elements disposed in a row and positioned on the transparent support side of the photosensitive means for converting input image data for one line to an optical signal, irradiating the transparent support of the photosensitive means with the converted light signal to form on the photosemiconductor an electrostatic latent image corresponding to the image data;

development means disposed on the opposite side of the photosensitive means from the exposure means for depositing toner having a polarity opposite to that of the electrostatic latent image on the latent image in the photosemiconductor layer by application of a predetermined bias voltage to a developing electrode;

transfer means for transferring the toner deposited on the photosemiconductor layer to a recording medium;

means for conveying the recording medium between the transfer means and the photo semiconductor layer;

means for rotating the photosensitive means;

fixing means for fixing the toner on the recording medium to the recording medium comprising two rollers disposed facing each other with the recording medium therebetween for pressing the recording medium; and control means for operating the exposure means, the development means, the conveying means, the fixing means and the rotating means synchronously with the receipt of said received image data, said control means including means for detecting an EOL signal representing an end of a line contained in the received data and forming a main scanning line synchronizing signal on the basis of the EOL signal for synchronizing purposes.

20. An electrophotographic recording apparatus comprising;

a photosensitive means including a transparent conductive layer and a photosemiconductor layer layered formed on a transparent support;

exposure means having a plurality of light emitting elements disposed in a row and positioned on the transparent support side of the photosensitive means for converting input image data for one line to an optical signal, irradiating the transparent support of the photosensitive means with the converted light signal to form on the photosemiconductor an electrostatic latent image corresponding to the image data;

development means disposed on the opposite side of the photosensitive means from the exposure means for depositing toner having a polarity opposite to that of the electrostatic latent image on the latent image in the photosemiconductor layer by application of a predetermined bias voltage to a developing electrode;

transfer means for transferring the toner deposited on the photosemiconductor layer to a recording medium;

means for conveying the recording medium between the transfer means and the photosemiconductor layer;

means for rotating the photosensitive means;

fixing means for fixing the toner on the recording medium to the recording medium comprising a flash lamp; and control means for operating the exposure means, the development means, the conveying means, the fixing means and the rotating means synchronously with the receipt of said received image data, said control means including means for detecting an EOL signal representing an end of a line contained in the received data and forming a main scanning line synchronizing signal on the basis of the EOL signal for synchronizing purposes.

* * * * *